June 3, 1952     G. CHIABERTA     2,598,973

AUTOMATIC CHARGING AND CONVEYING DEVICE

Filed Oct. 19, 1948

INVENTOR
GIOVANNI CHIABERTA
By: Young, Emery & Thompson
ATTORNEYS

Patented June 3, 1952

2,598,973

UNITED STATES PATENT OFFICE 2,598,973

AUTOMATIC CHARGING AND CONVEYING DEVICE

Giovanni Chiaberta, Milan, Italy, assignor to Bolloneria E. Viteria Italiana S. A. R. L. "B. E. V. I.," Milan, Italy Application October 19, 1948, Serial No. 55,363
In Italy October 23, 1947

2 Claims. (Cl. 10—165)

This invention relates to a device for collecting mechanical parts such as screws, bolts, rivets and the like manufactured on automatic machines and for transferring them in conveniently directed alignment to successive operations.

With the device according to this invention, collecting, directing and transport of the parts take place automatically. The device is provided with a hopper to which the parts manufactured and the machine tool are fed in bulk. The hopper discharges the material into a rotating drum provided with means adapted to convey the parts to a conveyer consisting of two juxtaposed rollers with inclined parallel axes rotating in opposite directions of which the parts are mostly automatically directed to the required position and brought in this condition to the next operation, while the parts that have not taken the desired direction are returned to the revolving drum for being recycled.

Further features of the device will appear from the following specification in which reference is made to the annexed drawings which show by way of example a construction thereof.

Figure 1:
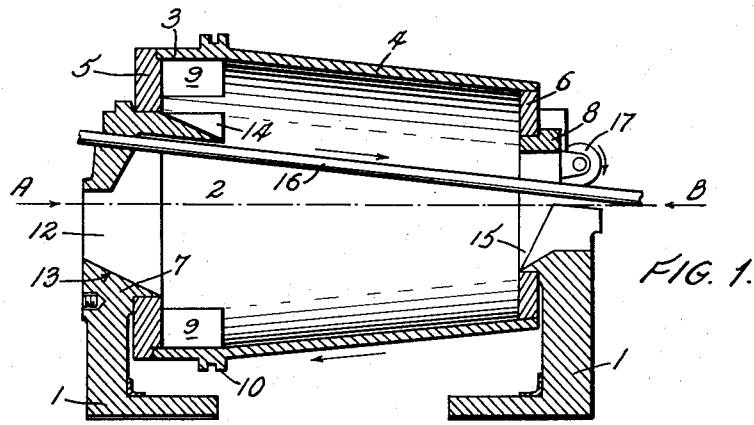
Fig. 1 is a section of the device on a vertical plane extending through its axis.
Figure 2:
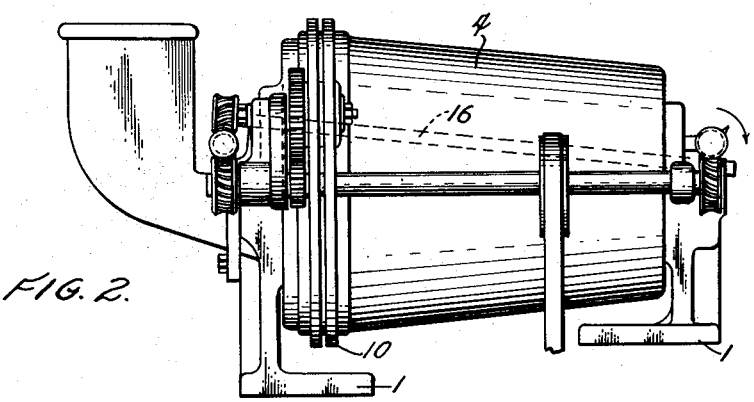
Fig. 2 is a side elevation of the device.

With reference to the drawings, 1 denotes the frame on which a drum 2 with horizontal axis is rotatably mounted. The drum 2 is formed by a hollow casing having a cylindrical section 3 merging into the larger base of the next section 4, which is frustrum-shaped. The drum is supported by means of two end rings 5 and 6.

The ring 6 is freely rotatable on the supporting hub 7 formed on the front side of the frame and the ring 6 rotated on the supporting hub 8 formed on the rear side of the frame.

Radial plates 9 are formed inside of the cylinder section 3 of the drum 2 and integral with the drum walls over a length substantially equal to the length of the cylindrical section. A groove pulley 10 is formed on the outer surface of the said cylindrical section and is driven by means of a belt by a further pulley keyed on a drive shaft carried by supports 11 on the brackets 11' encased integrally with the frame 1.

The opening 12 of the hopper is provided at the hub 7 at the front of the frame and communicates with the inside of the drum 2. Its lower surface 13 is in the form of a gradient to draw articles introduced through the opening and cause them to slide within the drum.

The hub 7 is provided on top with inclined plane 14 reaching within the drum 2 to enable articles falling on the said plane to slide by gravity towards the inside of the drum.

The opening 15 for communication with the inside of the drum 2 bored on the rear side of the frame 1 is at the hub 8. The lower surface of this opening forms an inclined surface to cause articles falling on said surface to slide within the drum.

Two rollers 16 and 16' having parallel axes arranged on the same plane inclined at its front end towards the back of the machine are arranged lengthwise within the drum 2 above its axis, and are suitably supported by the frame 1. The axes of said rollers are placed apart in order to leave between their opposite internal surfaces a predetermined clearance in accordance with the nature and size of the parts supplied to the device.

The front end of the rollers 16 and 16' is directly below the gradient 14 on the top portion of the hub 7 and project by their other end through the opening 15 at the back of the frame. Consequently, articles fed over the gradient 14, rollers 16 and 16' are caused to slide on the rollers and issue from the drum through the opening 15.

Figure 3:
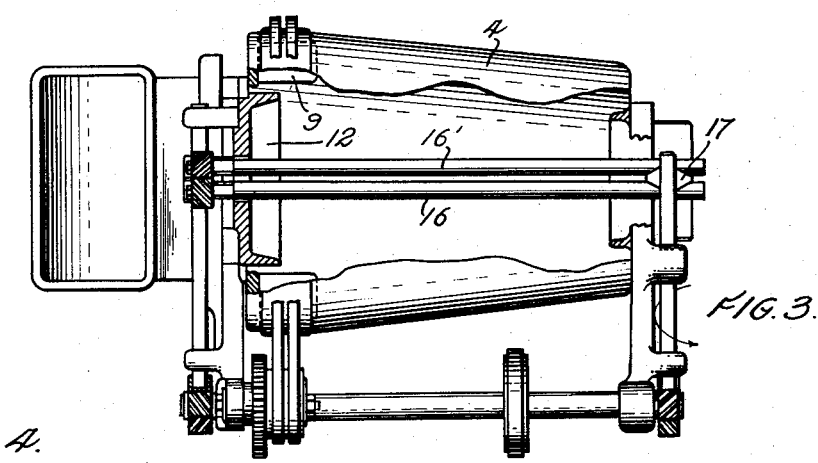
Fig. 3 is a plan view partly in section of the device showing the rollers forming the conveyer.
Figure 4:
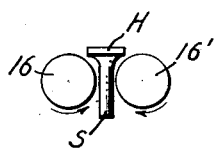
Fig. 4 is a diagrammatic end view of the rollers.

The mechanical parts (screws, bolts, rivets and the like) manufactured on an automatic machine tool which have to be transferred in a suitably directed arrangement to a further machine for the next operations are fed in bulk to the above described device through the opening 12, of which the gradient 13 admits them within the rotatable drum 2 of which the shape collects them in the cylindrical frame section. On rotation of the drum the blades 9 convey the parts supplied as above upwardly and place them on the gradient 14 by which they are guided on to the surface of the rollers 16 and 16'. These rollers perform an opposed rotary motion in the direction shown in Fig. 3 and convey the parts placed thereon by virtue of their inclination and of the said rotary motion towards the outlet of the drum 2 and direct them on their travel with their shank S turned downwards and their head H supported by the rollers as shown in Fig. 3.

A roller 17 is conveniently supported on the frame 1 and rotates on a suitable pivot, its outer surface being situated between rollers 16 and 16' at a predetermined distance from the top surface of the rollers, and performs a rotational movement in the direction indicated on the drawing (Fig. 1). Rotation of roller 17 is effected so that the surface of roller 17 facing the two rollers 16 is displaced towards the raised ends of said last mentioned rollers.

The functional purpose of this roller is to prevent parts which might not have been arranged in the desired manner on their path over the rollers 16 and 16' from issuing from the drum, and to cause them to fall on the lower gradient 15 which returns them to the drum 2 from which they are recycled as described above. The device may be varied with respect to the details described and shown in the drawing by way of example without departing from the scope of this invention.

What I claim is:

1. In a machine for feeding headed blanks, the combination of a support, a holder supported by said support and open at the rear end thereof, said holder being adapted to contain a quantity of blanks, means for rotating said holder, said holder being formed by a frusto-conical rotatable body having fixed to its larger end a cylindrical body, means for feeding the blanks to said holder to the cylindrical end, radial plates fixed to the inner wall of the cylindrical body and bringing on rotation of the holder the blanks to their top position in the holder, an inclined plane fixed to the support of the holder, said inclined plane receiving the blanks falling from the top of the holder, a pair of rollers having substantially parallel downwardly directed longitudinal axes, the opposed surfaces of said rollers being spaced apart by a distance such that a headed blank may be supported therebetween by engagement of the enlarged portion, while the part of the headed blank of smaller cross section is directed downwardly between said rollers, said rollers being placed below the previously mentioned inclined plane, means for rotating said rollers so that the opposed surfaces of the rollers rotate in an upward direction, and means for discharging from said rollers any blanks not arranged in the desired manner near the end of the holder of smaller cross section, the holder being so placed that, on rotation thereof, the blanks placed on the bottom of the holder are fed to the cylindrical end of said holder.

2. In a machine for feeding headed blanks, the combination of a support, a holder supported by said support and open at the rear end thereof, said holder being adapted to contain a quantity of blanks, means for rotating said holder, said holder being formed by a frusto-conical rotatable body having fixed to its larger end a cylindrical body, means for feeding the blanks to said holder to the cylindrical end, radial plates fixed to the inner wall of the cylindrical body and bringing on rotation of the holder, the blanks to their top position in the holder, an inclined plane fixed to the support of the holder, said inclined plane receiving the blanks falling from the top of the holder, a pair of rollers having substantially parallel downwardly directed longitudinal axes, the opposed surfaces of said rollers being spaced apart by a distance such that a headed blank may be supported therebetween by engagement of the enlarged portion, while the part of the headed blank of smaller cross section is directed downwardly between said rollers, said rollers being placed below the previously mentioned inclined plane, means for rotating said rollers so that the opposed surfaces of said rollers rotate in an upward direction, a roller supported on the machine frame and so arranged that its outer surface is situated between the two counter-rotating rollers at a predetermined distance from the top surface of said rollers, and means for rotating said last mentioned roller so that the surface of the roller facing the two previously mentioned counter-rotating rollers is displaced towards the raised ends of said counter-rotating rollers, said last mentioned roller causing the blanks placed on the counter-rotating rollers in incorrect position to fall into the holder, the holder being so placed that, on rotation thereof, the blanks placed on the bottom of the holder are fed to the cylindrical end of said holder.

GIOVANNI CHIABERTA.

REFERENCES CITED

The following references are of record in the file of this patent:

UNITED STATES PATENTS

| Number | Name | Date |
|---|---|---|
| 798,212 | Rainert | Aug. 29, 1905 |
| 1,692,456 | Lynch et al. | Nov. 20, 1928 |
| 1,741,033 | Neidlinger | Dec. 24, 1929 |
| 1,803,993 | Brennan | May 5, 1931 |
| 2,366,256 | Harris et al. | Jan. 2, 1945 |